United States Patent
Wittenbreder, Jr.

(10) Patent No.: US 7,864,549 B1
(45) Date of Patent: *Jan. 4, 2011

(54) ZERO VOLTAGE SWITCHING COUPLED INDUCTOR BOOST POWER CONVERTERS

(76) Inventor: Ernest Henry Wittenbreder, Jr., 3260 S. Gillenwater Dr., Flagstaff, AZ (US) 86001-8946

( * ) Notice: Subject to any disclaimer, the term of this patent is extended or adjusted under 35 U.S.C. 154(b) by 13 days.

This patent is subject to a terminal disclaimer.

(21) Appl. No.: 12/484,238

(22) Filed: Jun. 14, 2009

Related U.S. Application Data

(63) Continuation-in-part of application No. 11/626,908, filed on Jan. 25, 2007, now Pat. No. 7,551,459.

(60) Provisional application No. 60/766,547, filed on Jan. 26, 2006.

(51) Int. Cl.
*H02M 3/335* (2006.01)
(52) U.S. Cl. .................... 363/21.06; 363/97
(58) Field of Classification Search ........... 363/16, 363/20, 21.03, 21.04, 21.06, 97
See application file for complete search history.

(56) References Cited

U.S. PATENT DOCUMENTS

| | | | | |
|---|---|---|---|---|
| 5,570,278 A * | 10/1996 | Cross | ................ | 363/20 |
| 6,061,252 A * | 5/2000 | Hosotani | ................ | 363/16 |
| 6,144,564 A * | 11/2000 | Fraidlin et al. | ................ | 363/16 |
| 6,198,260 B1 * | 3/2001 | Wittenbreder | ................ | 323/271 |
| 6,856,522 B1 * | 2/2005 | Wittenbreder, Jr. | ........ | 363/21.01 |
| 6,934,167 B2 * | 8/2005 | Jang et al. | ................ | 363/21.02 |
| 7,209,369 B1 * | 4/2007 | Yasumura | ................ | 363/16 |
| 7,315,460 B2 * | 1/2008 | Kyono | ................ | 363/16 |
| 7,480,156 B1 * | 1/2009 | Wittenbreder, Jr. | ........... | 363/20 |
| 7,551,459 B1 * | 6/2009 | Wittenbreder, Jr. | ........ | 363/21.06 |
| 2004/0179377 A1 * | 9/2004 | Tamura | ................ | 363/16 |
| 2007/0263415 A1 * | 11/2007 | Jansen et al. | ............. | 363/21.03 |
| 2008/0304291 A1 * | 12/2008 | Degen et al. | ............. | 363/21.06 |

* cited by examiner

*Primary Examiner*—Jeffrey L Sterrett

(57) ABSTRACT

The subject invention reveals a new coupled inductor boost converter which achieves zero voltage turn on switching for all four circuit switches. The coupled inductor of the circuit is fully clamped and thereby achieves excellent noise performance with neither snubbers nor clamps. The new coupled inductor boost converter is outstanding for isolated high voltage applications because the voltage stress of the secondary switches does not exceed the output voltage, it requires only one magnetic circuit element, and the average voltage stress of the secondary winding is equal to or less than half the output voltage.

18 Claims, 7 Drawing Sheets

ZERO VOLTAGE SWITCHING COUPLED INDUCTOR BOOST POWER CONVERTERS

CROSS REFERENCE TO RELATED APPLICATIONS

This application claims the benefit of PPA Ser. No. 60/766,547, filed 2006 Jan. 26 by the present inventor. This application is a continuation in part of application Ser. No. 11/626,908 filed Jan. 25, 2007 now U.S. Pat. No. 7,551,459.

BACKGROUND OF THE INVENTION

1. Field of the Invention

The subject invention generally pertains to electronic power conversion circuits, and, more specifically, to high frequency, switched mode electronic power converters. The subject matter relates to new isolated power converters which achieve higher efficiency compared to prior art power converters.

2. Description of Related Art

Often a power conversion circuit such as a ZVS flyback converter, as illustrated in FIG. 1, is used to convert power efficiently at high switching frequencies. The efficiency advantage of the ZVS Flyback converter relates to its relative simplicity and its ability to achieve zero voltage switching over a broad range of line and load. One disadvantage of the ZVS flyback is that it transfers net energy from its primary circuit to its secondary circuit only during the off time of the main primary switch, $M_1$. Bidirectional ZVS flyback converters, such as FIG. 21 of U.S. Pat. No. 5,402,329 exist that can transfer energy to the secondary circuit during both states of the main switch. But, the net or average energy transferred from the primary circuit to the secondary circuit during the on time of the main switch is zero in the bidirectional flyback converter and in all flyback converters. In other words, there is no net energy transferred to the secondary circuit in a flyback converter during the on time of the main switch. The amount of energy transferred to the secondary circuit during the on time of the main switch in a bidirectional flyback converter is equal to the energy transferred from the secondary to the primary during the on time of the main switch. The coupled inductor boost converter is a topology that delivers net energy to the secondary circuit during both on state and off state of the main switch. The average current in the secondary circuit of a coupled inductor boost is lower than the average current in a flyback since the current flows during both operating states of the converter in a coupled inductor boost. Also, the voltage stress applied to secondary windings and secondary switches is lower in the coupled inductor boost converter giving the coupled inductor boost converter further advantages over the flyback. What is needed is a coupled inductor boost topology with zero voltage switching and an electromagnetic compatibility advantage.

OBJECTS AND ADVANTAGES

An object of the subject invention is to reveal a new beneficial power conversion circuit with higher efficiency and lower electromagnetic interference.

Further objects and advantages of my invention will become apparent from a consideration of the drawings and ensuing description.

These and other objects of the invention are provided by a novel circuit that can achieve zero voltage switching and which limits voltage stress of the power converter's secondary side switches and reduces overall component stress factors compared to the prior art.

SUMMARY

The subject invention reveals a new isolated ZVS coupled inductor boost converter which relies on leakage inductance of the coupled inductor to drive a zero voltage turn on switching transition for the main switch. The circuit requires only a single magnetic circuit element plus two active primary side switches and two secondary side rectifiers. The circuit achieves lower component stress, lower electromagnetic interference, and higher efficiency compared to other alternatives.

DESCRIPTION OF THE PREFERRED EMBODIMENTS

Figure 6:
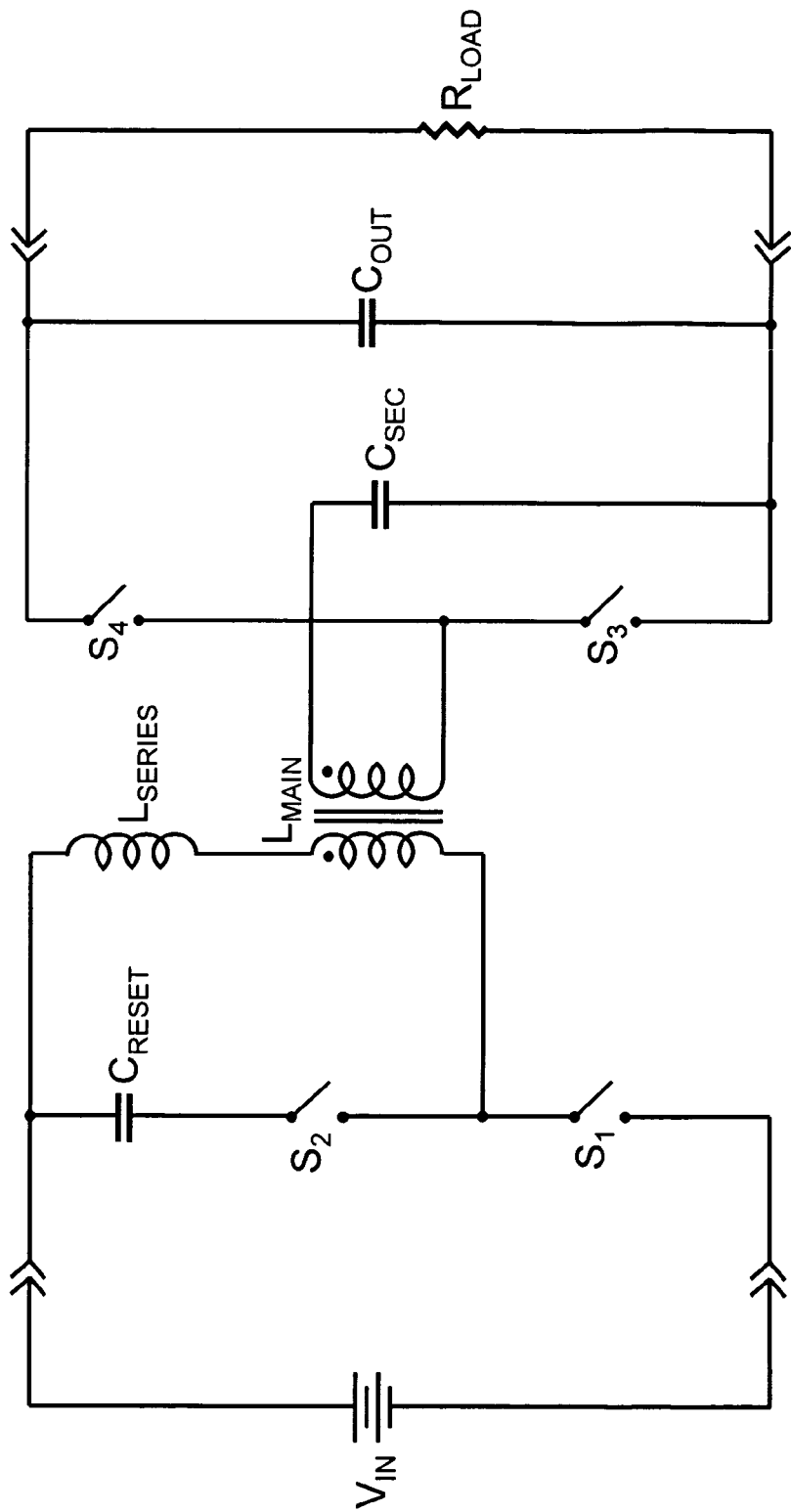
FIG. 6 illustrates a ZVS coupled inductor boost converter according to the subject invention.

FIG. 6 illustrates a ZVS coupled inductor boost power converter according to the subject invention. A first terminal of an input source of dc power and voltage is connected to a first terminal of a capacitor $C_{RESET}$ and to a dotted terminal of a primary winding of a coupled inductor $L_{MAIN}$ which has a substantial amount of leakage inductance and leakage flux due to its construction. Leakage inductance is the inductance associated with leakage flux which is flux generated in one winding that is not magnetically coupled to the other winding. The coupled inductor $L_{MAIN}$ is constructed in a manner typical of a flyback transformer having a core made from a magnetically permeable material with a substantial amount of energy storage capability, either by having a discrete air gap in its core or a distributed air gap throughout its core or some combination thereof. A second terminal of the input source of dc power and voltage is connected to a first terminal of a switch $S_1$. A second terminal of switch $S_1$ is connected to a first terminal of a switch $S_2$ and to an undotted terminal of primary winding of coupled inductor $L_{MAIN}$. A second terminal of switch $S_2$ is connected to a second terminal of capacitor $C_{RESET}$. $S_2$ and $C_{RESET}$ form an active reset network. A first terminal of a capacitor $C_{SEC}$ is connected to a dotted terminal of a secondary winding of coupled inductor $L_{MAIN}$. The secondary winding of $L_{MAIN}$ is magnetically coupled to the primary winding of $L_{MAIN}$ and the primary and secondary windings of $L_{MAIN}$ can be said to be mutually magnetically coupled. A second terminal of capacitor $C_{SEC}$ is connected to a first terminal of a switch $S_3$, to a first terminal of a capacitor $C_{OUT}$, and to a first terminal of a load $R_{LOAD}$. A second terminal of switch $S_3$ is connected to a first terminal of a switch $S_4$ and to an undotted terminal of the secondary winding of coupled inductor $L_{MAIN}$. A second terminal of switch $S_4$ is connected to a second terminal of capacitor $C_{OUT}$ and to a second terminal of load $R_{LOAD}$. In the context of this specification two circuit nodes or circuit elements are connected if there exists a direct wire low resistance dc path between the two circuit nodes or circuit elements. Two nodes that are connected will have substantially equal node voltages at all times. In the context of this specification two circuit nodes or circuit elements are coupled if there exists a low impedance ac path between the two nodes or circuit elements. The ac component of two nodes that are coupled will be substantially equal. In the context of this specification substantially shall mean mostly or for the most part but may or may not include precisely. Two circuit elements are considered to be connected in series if the currents in the two connected elements are substantially equal. Two circuit elements are considered to be connected in parallel if the voltages applied to the two connected circuit elements are substantially equal.

In operation the circuit has two operating states with dead times between operating states which are brief by comparison to the duration of the operating states. For purposes of analysis we will assume that the circuit has reached a steady state condition. We will also assume that the capacitors are sufficiently large that the capacitor voltages are invariant over a single operating cycle. During a first operating state switches $S_1$ and $S_3$ are on (conducting) and switches $S_2$ and $S_4$ are off (non-conducting). Current flows in a primary loop comprising the input source of dc voltage and power, the primary winding of coupled inductor $L_{MAIN}$, and switch $S_1$. Current also flows clockwise in a first secondary loop comprising $C_{SEC}$, $S_3$, and the secondary winding of coupled inductor $L_{MAIN}$, and clockwise in a second secondary loop comprising $C_{OUT}$ and $R_{LOAD}$. During the first operating state current ramps up in the primary loop. The rate of current rise is dependent on the value of leakage inductance of $L_{MAIN}$ and the effective voltage applied to the leakage inductance. The voltage applied by the input source will be divided between the magnetizing inductance of $L_{MAIN}$ and the leakage inductance of $L_{MAIN}$, based on the relative magnitudes of leakage inductance and magnetizing inductance. Current in the primary winding of $L_{MAIN}$ induces current into the secondary winding of $L_{MAIN}$ to charge $C_{SEC}$. The current in the secondary loop will also be a current ramp due to the effect of the leakage inductance. During the first operating state magnetizing current ramps up in $L_{MAIN}$. At the end of the first operating state $S_1$ is turned off thereby breaking the connection of the input source to the primary winding of $L_{MAIN}$. $S_1$ selectively applies the input source of power and voltage to the primary winding of $L_{MAIN}$. Stored magnetic energy in the leakage inductance and magnetizing inductance of $L_{MAIN}$ forces the voltage to rise at the undotted terminal of the primary winding of $L_{MAIN}$. The voltage at the undotted terminal of $L_{MAIN}$ continues to rise until the switch $S_2$ is turned on at the instant that the applied voltage of $S_2$ drops to zero volts or at a time at which a diode intrinsic to $S_2$ becomes forward biased and begins to conduct. With the change in applied voltages to the components in the primary circuit the current in the primary loop rapidly decreases. As a result of the rapidly decreasing current in the primary circuit the induced secondary current decreases until the current in the secondary circuit decreases to zero at which time switch $S_3$ is turned off. At the instant the switch $S_3$ turns off a voltage transition in the secondary circuit takes place and the switch $S_4$ is turned on. The voltage transition in the secondary circuit is slightly delayed with respect to the voltage transition in the primary circuit due to the effect of stored magnetic energy in the leakage inductance.

During a second operating state switches $S_2$ and $S_4$ are on and switches $S_1$ and $S_3$ are off. In the primary circuit current flows in a loop comprising the primary winding of $L_{MAIN}$, $C_{RESET}$, and $S_2$. During the second operating state, current first flows clockwise in the primary loop, but ramps down rapidly until the current is equal to the magnetizing current of $L_{MAIN}$ after which the current ramps down at a lower rate, drops to zero, reverses direction, and ramps up in the counterclockwise direction. In the secondary circuit current flows in a loop comprising the secondary winding of $L_{MAIN}$, $S_4$, $C_{SEC}$, $C_{OUT}$, and $R_{LOAD}$. The secondary current results from induced current from the primary circuit. During the second operating state current ramps up in the secondary loop starting from zero. The second operating state ends when switch $S_2$ is turned off. When $S_2$ is turned off the $S_1$ turn on switching transition begins. During the $S_1$ turn on transition the voltage difference between the two $S_1$ switch terminals falls to zero. When $S_2$ is turned off stored energy from the leakage inductance of $L_{MAIN}$ forces the voltage at the undotted terminal of $L_{MAIN}$ to fall until the applied voltage of $S_1$ reaches zero volts at which instant $S_1$ is turned on. $S_1$ may be turned on at the instant that the voltage difference between its terminal reaches zero volts or it may turn on as a result of the forward biasing of a diode intrinsic to $S_1$. With $S_1$ on the current in the leakage inductance of $L_{MAIN}$ falls rapidly and the induced current in the secondary winding of $L_{MAIN}$ also falls rapidly until the current in the switch $S_4$ reaches zero at which instant $S_4$ is turned off and a voltage transition in the secondary circuit takes place after which $S_3$ is turned on and the cycle repeats. During the $S_1$ turn on switching transition stored magnetizing energy in $L_{MAIN}$ may or may not contribute energy to the turn on of $S_1$. If the magnetizing current of $L_{MAIN}$ does not reverse direction during the second operating state then all of the energy needed to drive the $S_1$ switch voltage to zero must be contributed by the leakage inductance alone, but if the magnetizing current in $L_{MAIN}$ reverses then the magnetizing energy in $L_{MAIN}$ will also contribute to the turn on of $S_1$. $L_{MAIN}$ can be designed so that the magnetizing energy contributes to the turn on transition of $S_1$ or $L_{MAIN}$ can be designed so that the magnetizing energy of $L_{MAIN}$ does not contribute to the turn on transition of $S_1$ by choice of $L_{MAIN}$ magnetizing inductance. A lower $L_{MAIN}$ magnetizing inductance will result in magnetizing energy contributing to the turn on transition of $S_1$ over a larger portion of the load range, but ac magnetizing currents will be larger and the associated conduction losses will also be larger. Typically a compromise will be found in which the magnetizing energy contributes to the turn on transition of $S_1$ at light loads and the $S_1$ turn on energy is contributed by the leakage inductance alone at heavy loads.

FIGS. 5(a) through 5(h) illustrate the voltage and current wave forms in each of the switches. Except for the brief switching transitions in which both $S_1$ and $S_2$ are off the on/off states are opposite at all times. We describe this condition as $S_1$ and $S_2$ being operated in substantial anti-synchronization. $S_3$ and $S_4$ are, likewise, operated in substantial anti-synchronization. Except for brief timing delays caused by circuit parasitics $S_1$ and $S_3$ are on at the same times and off at the same times so that $S_1$ and $S_3$ are operated in substantial synchronization. $S_2$ and $S_4$ are, likewise, operated in substantial synchronization.

The FIG. 6 circuit achieves zero voltage switching for all of its switches and zero current switching for switches $S_3$ and $S_4$ for all switching transitions, thereby eliminating first order switching losses. The FIG. 6 circuit is particularly attractive since the maximum switch voltage stress in the secondary circuit does not exceed the output voltage. Another beneficial feature of the FIG. 6 circuit is that the circuit is fully clamped. In both operating states both windings of the coupled inductor are clamped so that the winding voltages are fixed and no ringing is possible. In the first operating state the primary winding is clamped by the input voltage source and the secondary winding is clamped by $C_{SEC}$. In the second operating state the primary winding is clamped by $C_{RESET}$ and the secondary winding is clamped by the series combination of $C_{SEC}$ and $C_{OUT}$. In each operating state each winding voltage is either connected to the input or to a capacitor so that, in some cases, the winding voltage can change to the extent that the capacitor voltages can change. The analysis assumptions specified capacitors sufficiently large that their voltages are invariant over a switching cycle. In a typical commercial power supply designed for low cost the capacitor voltages may not be invariant but they can easily be made to be sufficiently large that the frequency of any ringing will be at a frequency well below the switching frequency. For ringing at a frequency below the switching frequency the ringing would be a only small fraction of a cycle and there would be no significant consequences for electromagnetic interference. Also the magnitude of the low frequency ringing will be much lower than the line voltage in the primary circuit and much lower than the load voltage in the secondary circuit.

The transfer function for the FIG. 6 circuit is $$V_{OUT} = \frac{nV_{IN}}{(1-D)},$$

where $V_{OUT}$ is the load voltage, $V_{IN}$ is the voltage of the input source, n is the ratio of secondary turns to primary turns, and D is the duty cycle of the $S_1$ switch. Except for the turns ratio, n, the transfer function for the FIG. 6 circuit is identical to the transfer function for the simple boost converter.

Figure 1:
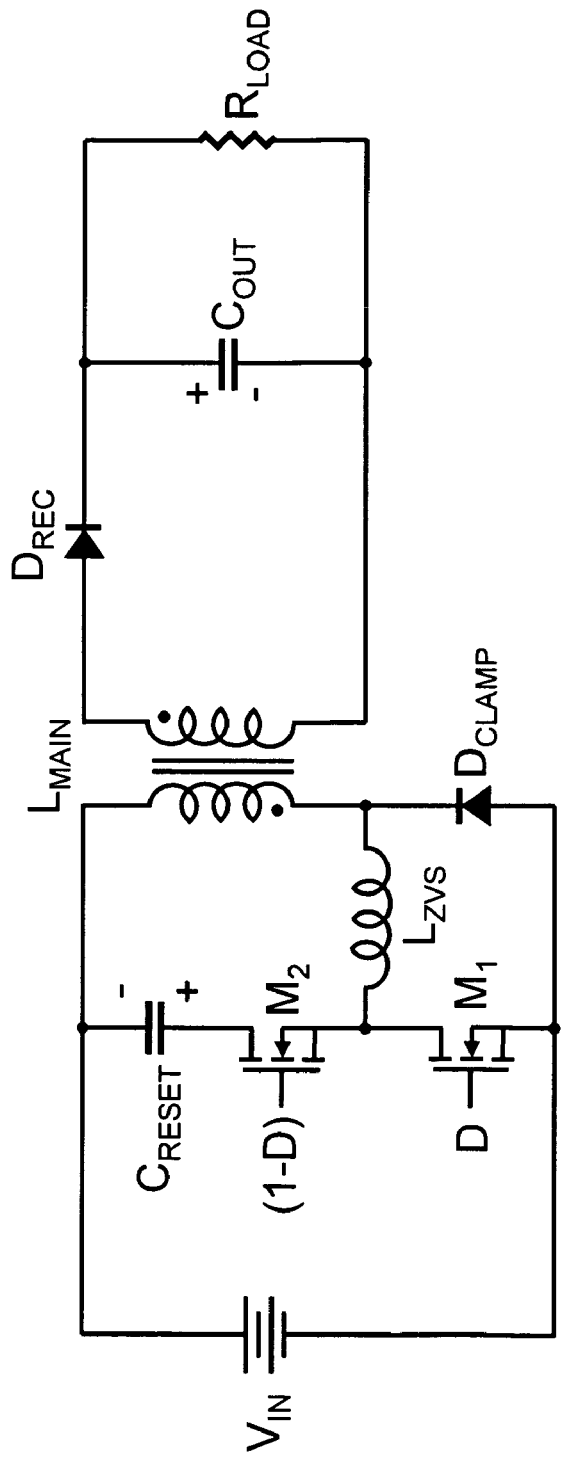
FIG. 1 illustrates a zero voltage switching (ZVS) active clamp flyback converter according to the prior art.
Figure 2:
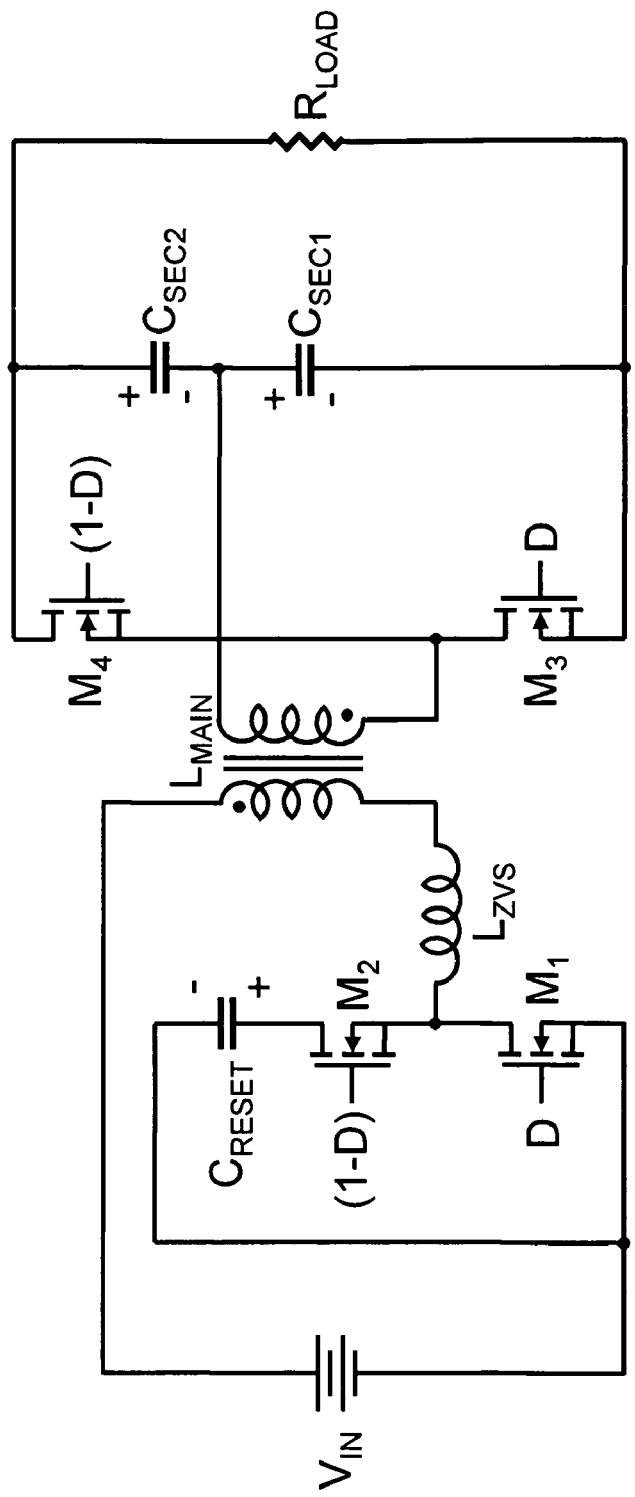
FIG. 2 illustrates a ZVS isolated coupled inductor boost converter with synchronous rectifiers according to the subject invention.

Another embodiment of the subject invention is illustrated in FIG. 2. In the FIG. 2 circuit all of the switches are implemented with mosfets and the secondary switches are synchronous rectifiers. The polarity of the secondary winding is reversed in FIG. 2 compared to the polarity indicated in FIG. 6. The output voltage is a sum of two voltages, one voltage is the secondary winding voltage of the first operating state and the second voltage is the secondary winding voltage of the second operating state. These two voltages will be reversed if the winding polarity is reversed, but the sum of voltages remains the same, regardless of the order and regardless of the secondary winding polarity, and the transfer function for FIG. 2 is the same as the transfer function for FIG. 6. In FIG. 6 the series inductance is illustrated as an inductor $L_{ZVS}$, which may be the leakage inductance of the coupled inductor $L_{MAIN}$, or $L_{ZVS}$ may be a separate wound inductor, or discrete inductor, separate from the leakage inductance of $L_{MAIN}$. Whether the series inductance is provided by a leakage inductance or a discrete series inductor is inconsequential and has no effect on the operation of the circuit. One other difference between the FIG. 6 circuit and the FIG. 2 circuit is the connection of the capacitor $C_{RESET}$ to the input. In FIG. 6 $C_{RESET}$ is connected to the positive input terminal and in FIG. 2 $C_{RESET}$ is connected to the negative input terminal. During the second operating state the input source $V_{IN}$ remains in the current loop so that $V_{IN}$ remains in the primary current loop during both or all operating states. In FIG. 6 the current from $V_{IN}$ is pulsating, but in FIG. 2 the current from $V_{IN}$ is continuous, non-pulsating, and linear, so that the electromagnetic interference from the current from $V_{IN}$ is reduced in FIG. 2 by comparison to the FIG. 6 current. The FIG. 6 connection of $C_{RESET}$ has the advantage of lower capacitor voltage stress. Another difference between the FIG. 6 embodiment and the FIG. 2 embodiment is that the FIG. 2 embodiment contains two secondary capacitors, both of which are connected to the secondary winding, but FIG. 2 contains no capacitor in parallel with the load, but rather a series pair of capacitors connected in parallel with the load. The FIG. 2 arrangement of secondary capacitors is a typical voltage doubler connection and results in reduced voltage stress of the two capacitor combination.

Figure 3:
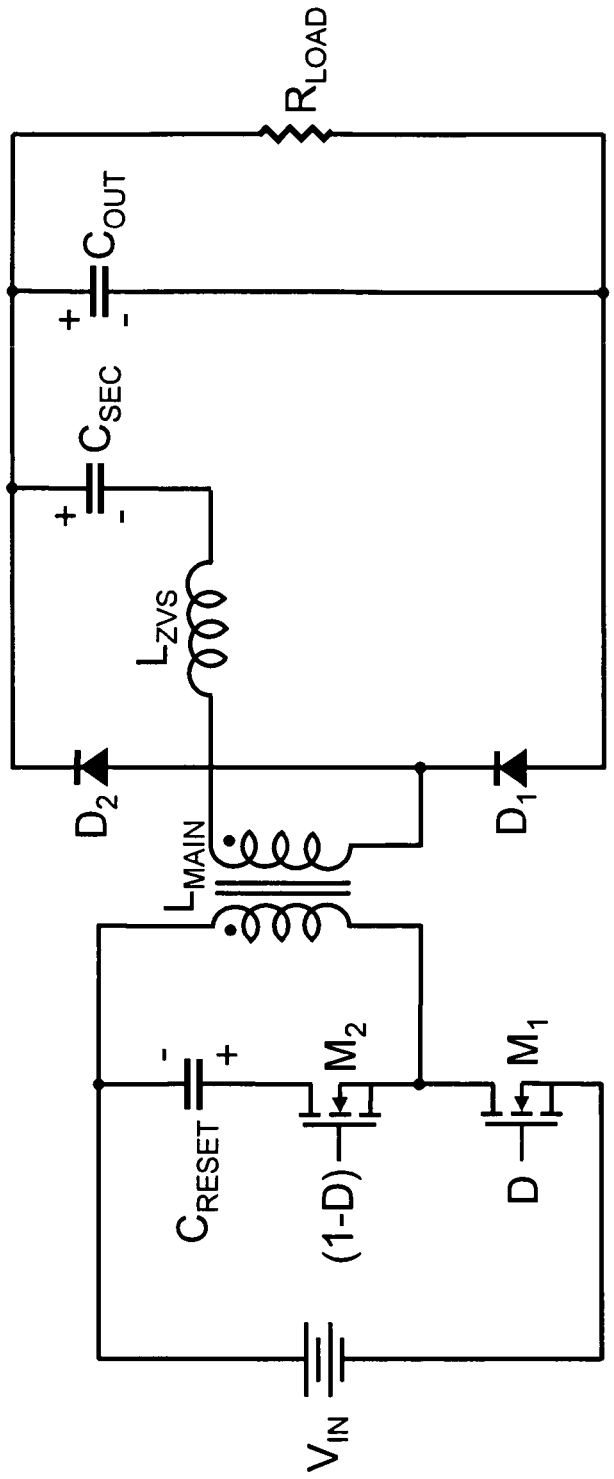
FIG. 3 illustrates a ZVS isolated coupled inductor boost converter with diode rectifiers according to the subject invention.

Another embodiment of the subject invention is illustrated in FIG. 3. In FIG. 3 the primary switches are implemented with mosfets, the secondary switches are implemented with rectifier diodes, and the series inductance $L_{ZVS}$ is placed in series with the secondary winding, instead of in series with the primary winding of the coupled inductor $L_{MAIN}$. The performance described above for FIG. 6 does not depend on the specific placement of the series inductance except that the series inductance must be placed in series with the coupled inductor. It does not matter whether the series inductance is placed in the primary winding, the secondary winding, or some combination of the two windings. Also, in FIG. 3 the connection of the capacitor $C_{SEC}$ is different than the connection shown in FIG. 6 in that the capacitor is connected to the negative terminal of the load in FIG. 6 and to the positive load terminal in FIG. 3. Again the results of the capacitor connection are inconsequential. Since the circuit performance is the same, regardless of how the capacitor $C_{SEC}$ is connected to the load it would make sense to connect $C_{SEC}$ to the load terminal which results in the lowest voltage stress on $C_{SEC}$. Another possibility is to connect two capacitors to the secondary winding and connect one of the capacitors to the positive load terminal and the other capacitor to the negative load terminal and eliminate the capacitor $C_{OUT}$, as illustrated in FIG. 2.

Figure 4:
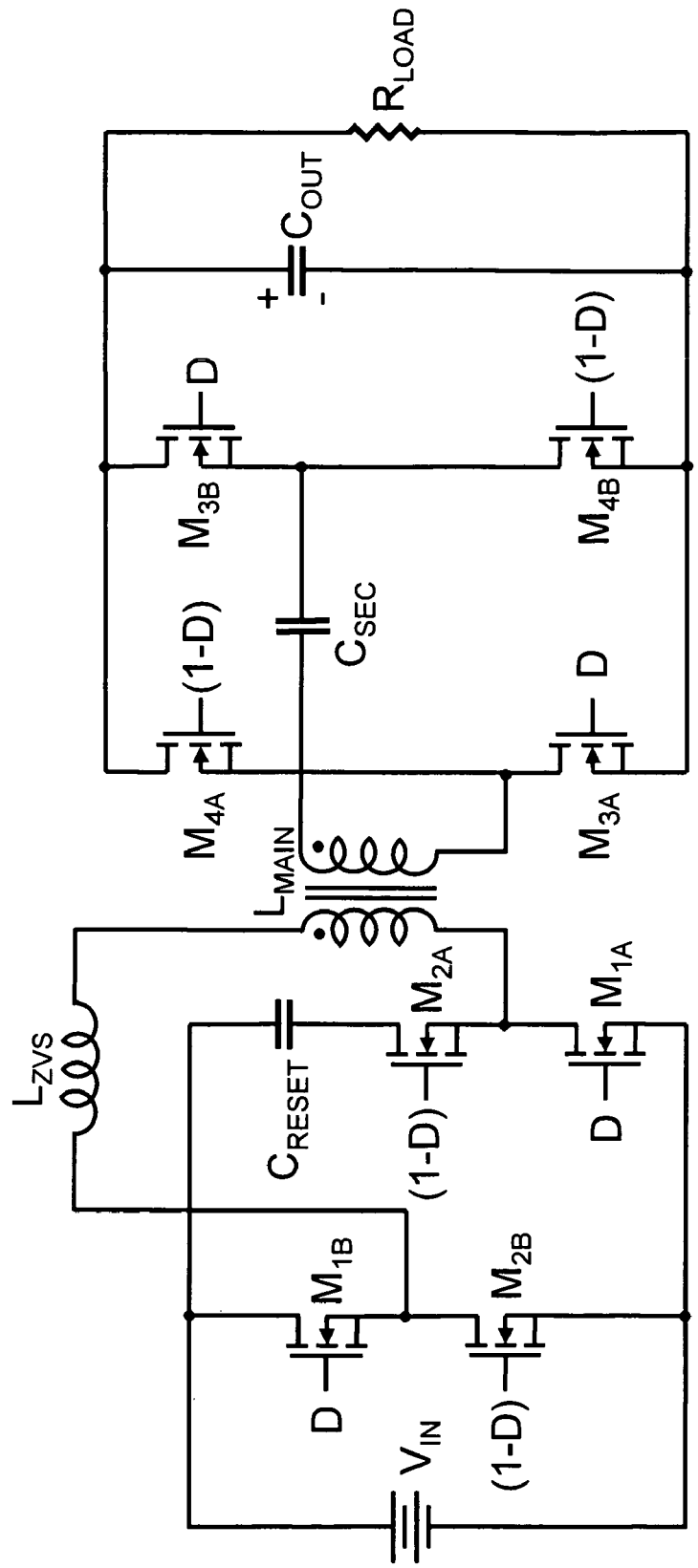
FIG. 4 illustrates a double switch reconfiguration of the FIG. 2 circuit according to the subject invention.
Figure 5:
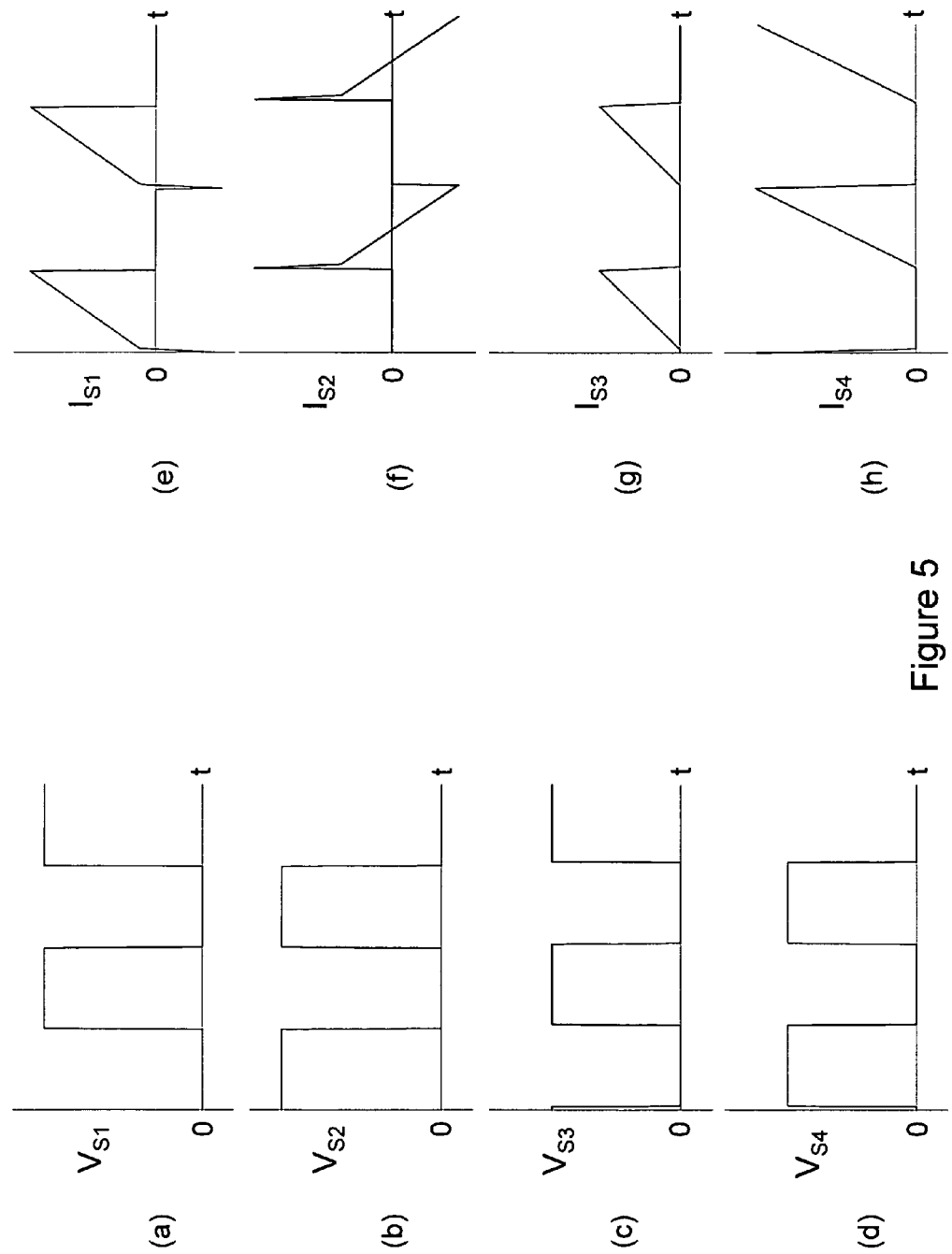
FIG. 5(a) illustrates a voltage wave form for the $M_1$ switch of FIG. 2 according to the subject invention.
FIG. 5(b) illustrates a voltage wave form for the $M_2$ switch of FIG. 2 according to the subject invention.
FIG. 5(c) illustrates a voltage wave form for the $M_3$ switch of FIG. 2 according to the subject invention.
FIG. 5(d) illustrates a voltage wave form for the $M_4$ switch of FIG. 2 according to the subject invention.
FIG. 5(e) illustrates a current wave form for the $M_1$ switch of FIG. 2 according to the subject invention.
FIG. 5(f) illustrates a current wave form for the $M_2$ switch of FIG. 2 according to the subject invention.
FIG. 5(g) illustrates a current wave form for the $M_3$ switch of FIG. 2 according to the subject invention.
FIG. 5(h) illustrates a current wave form for the $M_4$ switch of FIG. 2 according to the subject invention.

FIG. 4 illustrates another embodiment of the subject invention wherein the primary switches are split and rearranged in a way that reduces the primary switch voltage stress by an amount equal to the line voltage for the $M_{1A}$ and $M_{2A}$ switches. The voltage stress for the $M_{1B}$ and $M_{2B}$ switches will be equal to the input voltage. The primary switch arrangement resembles a full bridge circuit but it offers the same advantages that a double switch arrangement offers over a single switch arrangement, as is often done in single ended flyback and single ended forward converters to reduce switch voltage stress, spread out switch power losses, and extend the power handling capability of the circuit. In FIG. 4 the secondary circuit is also rearranged with two pairs of switches. In the secondary arrangement shown in FIG. 4, the output voltage is reduced by a factor of two and power is delivered to the load in both operating states. The FIG. 4 secondary switch arrangement offers an advantage because of its ability to transfer power from secondary winding to load in both operating states. In all of the previously described circuits the load must be powered from a capacitor with no direct contribution from the coupled inductor during one of the operating states.

Figure 7:
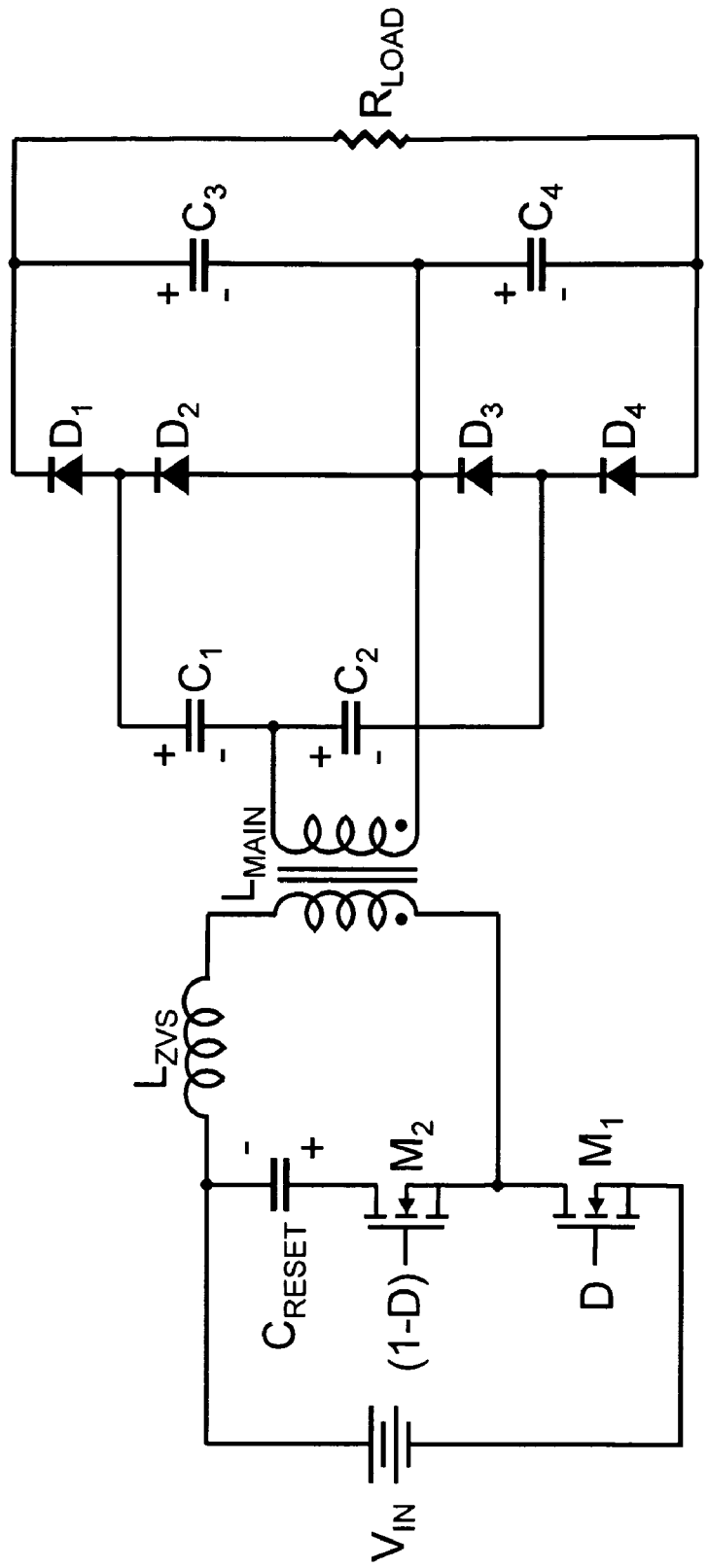
FIG. 7 illustrates a ZVS coupled inductor boost converter with a diode capacitance multiplier according to the subject invention.

FIG. 7 illustrates another embodiment of the subject invention using four secondary switches arranged to double the output voltage in comparison to the output voltage achieved in the FIG. 2 and FIG. 6 circuits. Additional diode switches and capacitors can be added to achieve output voltages higher than those in any of the circuits illustrated by adding more diodes and capacitors in the manner illustrated in FIG. 7.

CONCLUSION, RAMIFICATIONS, AND SCOPE OF INVENTION

Thus the reader will see that by the addition of an active reset network and an inductance in series with the coupled inductor in a coupled inductor boost converter a new beneficial coupled inductor boost converter is formed which achieves zero voltage turn on switching for all switches for all transitions. Variations of the new coupled inductor boost converter are also revealed which achieve higher or lower output voltage and reduced component stresses. The new coupled inductor boost converter achieves zero voltage switching without the ringing often associated with some zero voltage switching circuits because the new coupled inductor boost converter is fully clamped so that in all operating states all of the windings of the coupled inductor are coupled to capacitors.

While my above description contains many specificities, these should not be construed as limitations on the scope of the invention, but rather, as exemplifications or preferred embodiments thereof. Many other variations are possible. For example, in some of the circuits illustrated one can find alternate workable switches which can perform the same function as the switches illustrated in the figures. Circuits with higher orders of diode capacitance multipliers can be formed with higher output voltages by adding diodes and capacitors to the FIG. 7 circuit. Circuits similar to the circuits shown, but with multiple interleaved parallel circuits that share common capacitors are possible and should be considered embodiments of the subject invention. Circuits similar to the circuits shown but with polarity of the input or output reversed from that illustrated in the figures shall be considered embodiments of the subject invention. Circuits similar to those shown, but having coupled magnetic circuit elements with more than two windings and circuits with more than one output shall be considered embodiments of the subject invention. In many of the circuits shown there are series connected networks. The order of placement of circuit elements in series connected networks is inconsequential in the illustrations shown so that series networks in the illustrated circuits with circuit elements reversed or placed in an entirely different order within series connected networks are equivalent to the circuits illustrated and shall be considered embodiments of the subject invention. Also, one of the embodiments illustrated shows simple switches, but the operation revealed and the benefits achieved in the subject invention can also be realized in circuits that implement the switches using N channel mosfets, P channel mosfets, IGBTs, JFETs, bipolar transistors, relays, junction rectifiers, or schottky rectifiers, which should be considered embodiments of the subject invention.

Accordingly, the scope of the invention should be determined not by the embodiments illustrated, but by the appended claims and their legal equivalents.

I claim:
1. A coupled inductor boost power converter, comprising,
a first coupled inductor having a magnetically permeable core having substantial energy storage capability, having a primary winding and a secondary winding, said windings being mutually magnetically coupled, wherein said primary winding has a dotted terminal and an undotted terminal and said secondary winding has a dotted terminal and an undotted terminal,
a second inductance connected in series with said first coupled inductor,
a primary circuit network comprising,
an input coupleable to a source of dc power, having a first terminal and a second terminal,
said primary winding of said first coupled inductor,
first switch means having a first terminal and a second terminal for selectively applying said source of dc power to said primary winding of said first coupled inductor,
an active reset network having a first terminal and a second terminal comprising,
second switch means operable substantially in anti-synchronization to said first switch means, and
a first capacitor coupled to said second switch means wherein the current in said second switch means is substantially equal to the current in said first capacitor,
a secondary circuit network comprising,
an output coupleable to a load, having a first terminal and a second terminal,
said secondary winding of said first coupled inductor,
a second capacitor connected to said secondary winding of said first coupled inductor,
a third capacitor connected to said output,
third switch means having a first terminal and a second terminal wherein said first terminal of said third switch means is coupled to said secondary winding of said first coupled inductor and said second terminal of said third switch means is connected to said output,
fourth switch means having a first terminal and a second terminal operable substantially in anti-synchronization to said third switch means wherein said first terminal of said fourth switch means is connected to said output and said second terminal of said fourth switch means is coupled to said secondary winding of said first coupled inductor,
whereby substantial net energy is transferred to said secondary circuit network during an on state of said first switch means and substantial net energy is transferred to said secondary circuit network during an off state of said first switch means, the current in said primary winding of said first coupled inductor reverses direction during said off state of said first switch means, and said second inductance contributes energy to reduce the voltage difference between said first terminal of said first switch means and said second terminal of said first switch means during a turn on switching transition of said first switch means.

2. The coupled inductor boost power converter as set forth in claim 1 wherein said switch means comprise semiconductor switch means.

3. The coupled inductor boost power converter as set forth in claim 2 wherein said third switch means and said fourth switch means comprise rectifier diodes.

4. The coupled inductor boost power converter as set forth in claim 2 wherein said first switch means and said second switch means comprise mosfets.

5. The coupled inductor boost power converter as set forth in claim 2 wherein said first switch means, said second switch means, said third switch means, and said fourth switch means comprise mosfets.

6. The coupled inductor boost power converter as set forth in claim 1 wherein said second inductance is a discrete inductor.

7. The coupled inductor boost power converter as set forth in claim 6 wherein said discrete inductor is connected in series with said primary winding of said first coupled inductor.

8. The coupled inductor boost power converter as set forth in claim 6 wherein said discrete inductor is connected in series with said secondary winding of said first coupled inductor.

9. The coupled inductor boost power converter as set forth in claim 6 wherein said discrete inductor is a second coupled inductor having a primary winding connected in series with said primary winding of said first coupled inductor and having a secondary winding connected in series with said secondary winding of said first coupled inductor.

10. The coupled inductor boost power converter as set forth in claim 1 wherein said second inductance comprises leakage inductance of said first coupled inductor.

11. The coupled inductor boost converter as set forth in claim 1 wherein said first terminal of said active reset network is connected to said primary winding of said first coupled inductor.

12. The coupled inductor boost converter as set forth in claim 11 wherein said second terminal of said active reset network is connected to said first terminal of said input.

13. The coupled inductor boost converter as set forth in claim 11 wherein said second terminal of said active reset network is connected to said second terminal of said input.

14. The coupled inductor boost converter as set forth in claim 11 wherein said first terminal of said active reset network is connected to said undotted terminal of said primary winding of said first coupled inductor and to said first terminal of said first switch means, said dotted terminal of said primary winding of said first coupled inductor is connected to said first terminal of said input, and said second terminal of said first switch means is connected to said second terminal of said input.

15. The coupled inductor boost converter as set forth in claim 1 wherein said second terminal of said third switch means is connected to said first terminal of said output and said first terminal of said fourth switch means is connected to said second terminal of said output.

16. The coupled inductor boost converter as set forth in claim 1 wherein said second terminal of said third switch means is connected to said second terminal of said output and said first terminal of said fourth switch means is connected to said first terminal of said output.

17. The coupled inductor boost converter as set forth in claim 1 wherein said first coupled inductor contributes energy to reduce the voltage difference between said first terminal of said second switch means and said second terminal of said second switch means during a turn on switching transition of said second switch means.

18. The coupled inductor boost converter as set forth in claim 1 further comprising,
fifth switch means having a first terminal and a second terminal operable substantially in synchronization with said fourth switch means wherein said first terminal of said fifth switch means is coupled to said secondary winding of said first coupled inductor and said second terminal of said fifth switch means is connected to said output,
sixth switch means having a first terminal and a second terminal operable substantially in anti-synchronization to said fifth switch means wherein said first terminal of said sixth switch means is connected to said output and said second terminal of said sixth switch means is coupled to said secondary winding of said first coupled inductor.

* * * * *